Patented Dec. 29, 1931

1,838,599

UNITED STATES PATENT OFFICE

SIDNEY D. WELLS, OF QUINCY, ILLINOIS, ASSIGNOR TO PAPER MILL LABORATORIES, INC., OF QUINCY, ILLINOIS, A CORPORATION OF ILLINOIS

PRODUCTION OF LACTIC ACID AND OTHER PRODUCTS BY FERMENTATION

No Drawing.  Application filed July 26, 1928. Serial No. 295,620.

This invention relates to the production of lactic acid, alcohols and other products by fermentation which is carried on under conditions particularly conducive to vigorous action in a mash rich in carbohydrate and nitrogenous matter.

The invention is particularly directed to an improvement of the mash material and conditions of fermentation to effect a large yield, whether it be alcohols, ketones, or aldehydes or other products obtainable by fermentation. This improvement is brought about by using a certain material as the basis of the bulk of the mash. This particular material is the spent cooking liquor remaining after fibrous vegetable material has been cooked with certain particular mild cooking agents.

In cooking straw or other fibrous plant material with mild cooking agents such as sodium or potassium carbonate, sodium or potassium sulphite, sodium or potassium sulphide and the like for the production of paper pulp, the spent cooking liquors resulting therefrom are rich in carbohydrate and nitrogenous vegetable material. Mixtures of the aforementioned agents may be used in any combination but are preferably the salts of a weakly ionized polybasic acid as for instance carbonates or sulphides with alkali sulphites. The liquors are capable of supporting numerous bacterial, fungus and other growths which produce various materials such as aliphatic alcohols, acids, aldehydes, ketones, esters, carbon dioxide, hydrogen, ammonia, and others, depending on what particular growth or growths predominate.

In order to produce certain materials efficiently, it has now been found advantageous to subject the liquors to hydrolyzing conditions so that, for instance, the carbohydrates present are changed in whole or in part into reducing sugars.

The process set forth herein is a modification of the process described in my application Serial No. 190,556, filed May 11, 1927. As in that process so here, a strong cooking liquor such as that from caustic processes is not suitable, nor is the sugar containing material resultant of the so-called sulphite cooking process included in the present invention.

The spent cooking liquor of the type used in the present invention is hydrolyzed with substantially 2% by volume of sulphuric acid specific gravity 1.8 or its equivalent of other acids such as hydrochloric acid. The acid-treated liquor is subjected to heat and preferably under pressure. For example, the acid-treated liquor is heated to a temperature of about 248° F. for about one hour. At such a temperature a pressure of one atmosphere exists. Other temperatures may be used, however, depending on the condition of the material treated or the duration of the conversion. For example, at about 270° F. conversion takes place in ten minutes.

By this treatment a considerable proportion of the carbohydrates present in the liquor is hydrolyzed to xylose, glucose or other reducing sugars, depending on the vegetable material under treatment. The excess of sulphuric acid is then neutralized with milk of lime or calcium carbonate and the neutralized liquor fermented at the proper temperature by the addition of a pure culture of yeast, preferably Saccharomyces and other budding fungi such as mucor mucedo. Some autolyzed yeast may be added to furnish additional nitrogen. The fermented mash is distilled to separate out the crude spirits. This is subsequently fractionated and various mixed fractions are obtainable. In the above procedure the principal product obtained is ethyl alcohol.

Fermentation of the hydrolyzed liquor with lactic acid bacteria yields volatile acids such as acetic acid and non-volatile acids such as lactic acid. The latter acid is produced principally from the hexoses present in the liquor by means of various kinds of fission-fungi, Schizomycetes, bacilli, and micrococci. The acetic acid is obtained by fermentation in the presence of acetic acid bacteria.

Other incidental products are obtainable during the fermentation and subsequent treatment. At the fermenters the gas driven off includes carbon dioxide and hydrogen, both of which can be used. The liquor from the stills may be treated for the recovery of soda or potash.

One of the important phases of this invention is the preparation of a mash for the production of organic substances. Thus the invention may in part be considered directed toward the treatment of straw or other vegetable material for the production of the mash. In preparing the mash, thus consisting of the spent cooking liquor specifically defined or of wash water resultant of washing fibrous plant material after such cooking, straw may be treated with a milk of lime solution containing lime (CaO) to the extent of ten percent of the weight of the straw, or it may be treated with a solution containing five percent by weight of sodium carbonate and one-half percent sulphur, or it may be treated with a solution containing seven percent sodium carbonate and one and one-half percent sodium sulphite, or it may be treated with a solution containing three percent sodium hydroxide and two percent sodium sulphide. In each case it is cooked in a digester at a temperature of about 250° F. for ten hours. The contents are then emptied and the water soluble matter washed from the residue and stored for further treatment. Where fibrous vegetable material is used, the residue obtained from the digestion mentioned above may be used in the manufacture of paper, paperboard or other fibrous products according to methods known to those versed in the art.

To the aforementioned collected liquor or wash water, the desired amount of acid is added to bring about hydrolysis. The hydrolyzed liquor is neutralized to remove at least a part of the acidity and is allowed to ferment in the presence of certain microorganisms depending on the product desired. Where alcohol is desired various forms of Saccharomycetes may be used as for instance S. cerevisiæ or S. ellipsoideus I. Where lactic acid is desired various forms of bacteria of the class Schizomycetes may be used as for instance bacterium lactis Lister or bacillus acidi lactici Hueppe. For producing acetic acid, bacterium aceti may be used. The fermented mash is distilled to separate out the products of fermentation.

In a somewhat different treatment, straw may be treated with a solution containing from five to ten percent of its weight in soda ash or in a solution containing from four to ten percent of its weight of caustic soda. The other cooking conditions would be the same as above specified. Different amounts require different cooking conditions. The amount of cooking reagent may be varied greatly and depends on the relative value of the products obtainable from the spent cooking liquor and the straw-board obtained from the fibrous residue. It has been noticed that the greater the amount of cooking material and the more severe the cooking conditions, the greater the amount of straw matter dissolved in the liquor and the smaller the amount of fibrous residue.

It is important that the cooking step be a mildly alkaline or a neutral digestion. The substances which render the liquor of the mash of the present invention particularly important for fermentation purposes are peculiar in that these materials are not derived from cellulose but actually occur with the cellulose in the plant and are obtained without any breaking down of the cellulose as is the condition occurring in the bisulphite process.

The waste liquors obtained from the mild cooking of various straws, bagasse, bamboo, grasses, and the like, are particularly suitable for the present process. The vegetable fibrous material may be digested primarily for the production of these fermentable solutions and the fiber used for paper only as a biproduct, or the cooking material may be used in the mash of the present invention after the usual cooking operation in the production of paper.

The conditions prescribed in the foregoing for the cooking reagent are typical, but the present process is not limited to the particular cooking materials mentioned. A wide variation of cooking materials may be used. However, it is of major importance that the cooking be mild and that the action be terminated before the vegetable material is pulped and approximately as soon as it is softened, as contrasted to being pulped. Thus the cooking material is substantially the same kind and strength of cooking reagent as I have defined for use for the treatment of vegetable fibrous material for the production of pulp by two stages including first a mild cooking to effect softening as contrasted with pulping and secondly, a treatment of the softened fibers by mechanical means to effect their separation and all of which features have been defined in my applications for patent for the production of pulp, Serial Nos. 38,354, filed June 19, 1925; 49,461, filed August 10, 1925; 119,471, filed June 29, 1926; 121,052, filed July 7, 1926; 128,714, filed August 11, 1926; and 137,819, filed September 25, 1926.

I claim:

1. A process of manufacturing chemicals by fermentation, which process consists of hydrolyzing the liquor resultant of the cooking of fibrous plant material with a mild cooking agent under conditions resulting in a softening but not in a pulping of the fibrous plant material and having in water a mild alkaline reaction, neutralizing the hydrolyzed liquor, fermenting the neutralized, hydrolyzed liquor, and recovering the chemicals formed during the fermentation.

2. A process of manufacturing organic substances by fermentation, which process consists of hydrolyzing the liquor resultant of the cooking of fibrous plant material with a mild cooking agent under conditions resulting in a softening but not in a pulping of the fibrous plant material and having in water a mild alkaline reaction, neutralizing the hydrolyzed liquor, fermenting the neutralized, hydrolyzed liquor, and recovering the distillable products formed during the fermentation.

3. A process of manufacture organic substances by fermentation, which process consists of acidifying the liquor resultant of the cooking of fibrous plant material with a mild cooking agent under conditions resulting in a softening but not in a pulping of the fibrous plant material and having in water a mild alkaline reaction, heating the acidified liquor, neutralizing at least a part of the acid therein, and fermenting to produce the said organic substances.

4. A process of manufacturing lactic acid which process consists of fermenting in the presence of a lactic acid bacteria a mash comprising neutralized, hydrolyzed spent cooking liquor resultant of the cooking of fibrous plant material with a mild cooking agent under conditions resulting in a softening but not in a pulping of the fibrous plant material and having in water a mild alkaline reaction, and recovering the distillable products formed including lactic acid.

5. A process of manufacturing lactic acid which process consists of fermenting in the presence of a lactic acid bacteria a mash comprising neutralized, hydrolyzed spent cooking liquor resultant of the cooking of fibrous plant material with a mild cooking agent including in solution an alkali metal carbonate and a sulphite of an alkali-forming metal under conditions resulting in a softening but not in a pulping of the fibrous plant material, and recovering the distillable products formed including lactic acid.

6. A process of manufacturing lactic acid which process consists of fermenting in the presence of a lactic acid bacteria a mash comprising neutralized, hydrolyzed spent cooking liquor resultant of the cooking of fibrous plant material with a mild cooking agent including in solution sodium carbonate and an alkali metal sulphite under conditions resulting in a softening but not in a pulping of the fibrous plant material, and recovering the distillable products formed including lactic acid.

7. A process of manufacturing lactic acid which process consists of fermenting in the presence of a lactic acid bateria a mash comprising neutralized, hydrolyzed spent cooking liquor resultant of the cooking of fibrous plant material with a mild cooking agent including in solution sodium carbonate and sodium sulphite under conditions resulting in a softening but not in a pulping of the fibrous plant material, and recovering the distillable products formed including lactic acid.

8. A process of manufacturing lactic acid which process consists of fermenting in the presence of a lactic acid bacteria, a mash comprising neutralized, hydrolyzed spent cooking liquor resultant of the cooking of fibrous plant material with a mild cooking agent including in solution sodium sulphite and the sodium salt of a weakly ionized polybasic acid under conditions resulting in a softening but not in a pulping of the fibrous plant material, and recovering the distillable products formed during the fermentation including lactic acid.

9. A process of manufacturing lactic acid which process consists of fermenting in the presence of a lactic acid bacteria a mash comprising neutralized, hydrolyzed spent cooking liquor resultant of the cooking of fibrous plant material with a solution of sodium carbonate and an alkali metal sulphur compound under conditions resulting in a softening but not in a pulping of the fibrous plant material, and recovering the distillable products formed including lactic acid.

10. A process of manufacturing lactic acid which process consists of fermenting in the presence of a lactic acid bacteria a mash comprising neutralized, hydrolyzed spent cooking liquor resultant of the cooking of fibrous plant material with a solution of sodium carbonate under conditions resultant in a softening but not in a pulping of the fibrous plant material, and recovering the distillable products formed including lactic acid.

11. A process of manufacturing lactic acid which process consists of fermenting in the presence of a lactic acid bacteria a mash comprising neutralized, hydrolyzed spent cooking liquor resultant of the cooking of fibrous plant material with a mild cooking agent including in solution an alkali metal carbonate and a sulphite of an alkali-forming metal under conditions resulting in a softening but not in a pulping of the fibrous plant material, and recovering the distillable products formed including lactic acid.

12. A process of manufacturing lactic acid which process consists of fermenting in the presence of a lactic acid bacteria a mash comprising neutralized, hydrolyzed spent cooking liquor resultant of the cooking of fibrous plant material with a mild cooking agent including in solution sodium carbonate and a sulphite of an alkali-forming metal under conditions resulting in a softening but not a pulping of the fibrous plant material, and recovering the distillable products formed including lactic acid.

13. A process of manufacturing lactic acid which process consists of fermenting in the presence of a lactic acid bacteria a mash comprising neutralized, hydrolyzed spent cooking liquor resultant of the cooking of fibrous plant material with a solution of sodium carbonate and a sulphur compound of an alkali-forming metal under conditions resulting in a softening but not in a pulping of the fibrous plant material and recovering the distillable products formed including lactic acid.

In testimony whereof I affix my signature.

SIDNEY D. WELLS.